No. 616,563. Patented Dec. 27, 1898.
W. R. TAYLOR.
ALUMINIUM CASK.
(Application filed Oct. 25, 1897.)
(No Model.) 4 Sheets—Sheet 1.

Witnesses.
Robt A Blake
R. A. Smith.

Inventor,
William Rowland Taylor,
by Henry H. Keith
Attorney.

No. 616,563. Patented Dec. 27, 1898.
W. R. TAYLOR.
ALUMINIUM CASK.
(Application filed Oct. 25, 1897.)
(No Model.) 4 Sheets—Sheet 2.

Witnesses
Robt. A. Blake.
R. A. Smith.

Inventor
William Rowland Taylor,
by Henry H. Leigh
Attorney

No. 616,563. Patented Dec. 27, 1898.
W. R. TAYLOR.
ALUMINIUM CASK.
(Application filed Oct. 25, 1897.)

(No Model.) 4 Sheets—Sheet 3.

Witnesses.
Robt. A. Blake
R. A. Smith.

Inventor,
William Rowland Taylor,
by Henry H. Leigh
Attorney.

THE NORRIS PETERS CO., PHOTO-LITHO., WASHINGTON, D. C.

No. 616,563. Patented Dec. 27, 1898.
W. R. TAYLOR.
ALUMINIUM CASK.
(Application filed Oct. 25, 1897.)

(No Model.) 4 Sheets—Sheet 4.

Witnesses.
Rob.t A. Blake.
R. A. Smith

INVENTOR,
William Rowland Taylor,
by Henry H. Leigh
Attorney.

UNITED STATES PATENT OFFICE.

WILLIAM ROWLAND TAYLOR, OF ROCHESTER, ENGLAND.

ALUMINIUM CASK.

SPECIFICATION forming part of Letters Patent No. 616,563, dated December 27, 1898.

Application filed October 25, 1897. Serial No. 656,343. (No model.)

*To all whom it may concern:*

Be it known that I, WILLIAM ROWLAND TAYLOR, a subject of the Queen of the United Kingdom of Great Britain and Ireland, residing at No. 2 Star Hill Villas, Rochester, in the county of Kent, England, have invented certain new and useful Improvements in and Connected with Aluminium Casks, (for which I have obtained the following patent: Great Britain and Ireland, No. 15,278, dated July 9, 1896;) and I do hereby declare that the following is a full, clear, and exact description of the invention, reference being made to the accompanying drawings, which are to be taken as part of this specification and read therewith, and one which will enable others skilled in the art to which it appertains to make and use the same.

My invention relates to improvements in and connected with the aluminium cask described in the specification of Letters Patent No. 22,843 of 1892, granted to me, and to drums, barrels, hogsheads, barrel and other churns, as well as to hollow inclosed vessels generally, hereinafter referred to as "casks."

Figure 1:
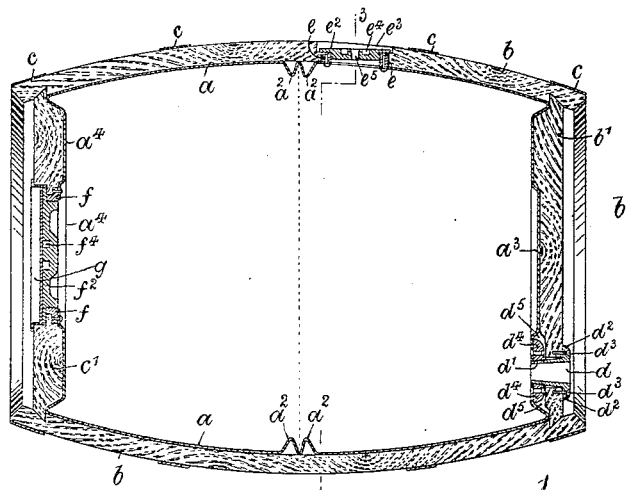
Figure 3:
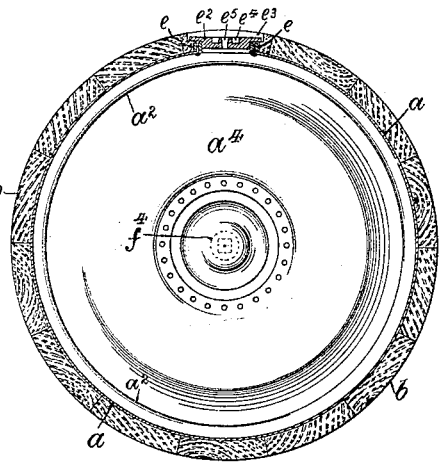
Figure 2:
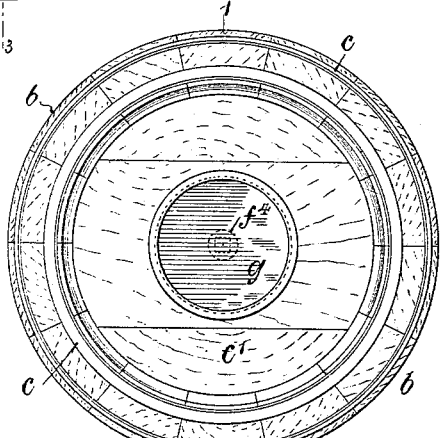
Figure 4:
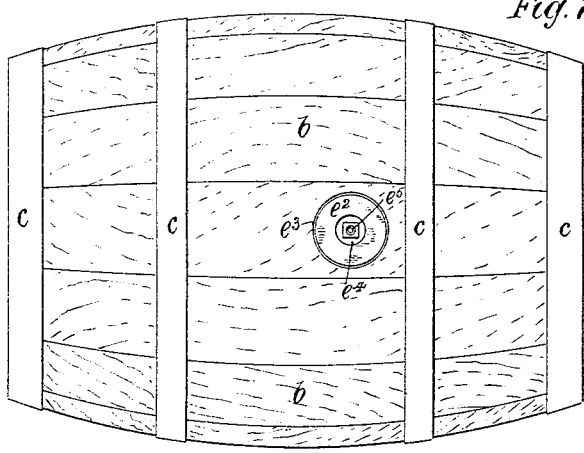
Figure 5:
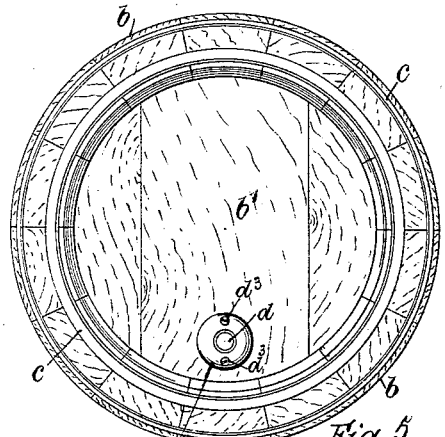
Figure 6:
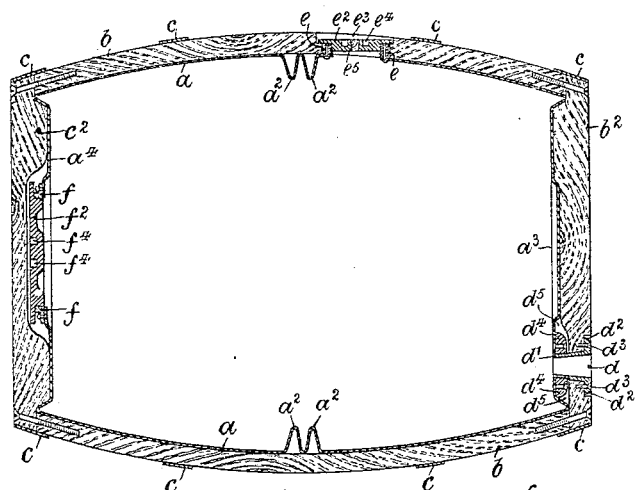
Figure 8:
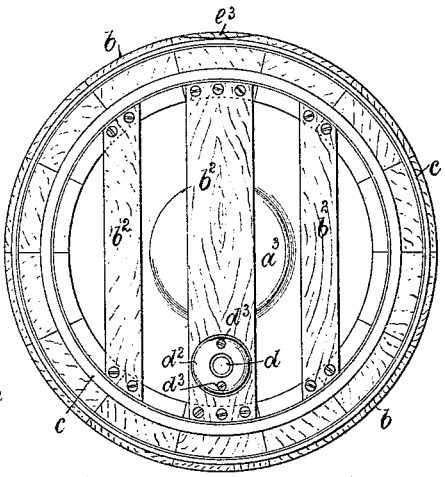
Figure 7:
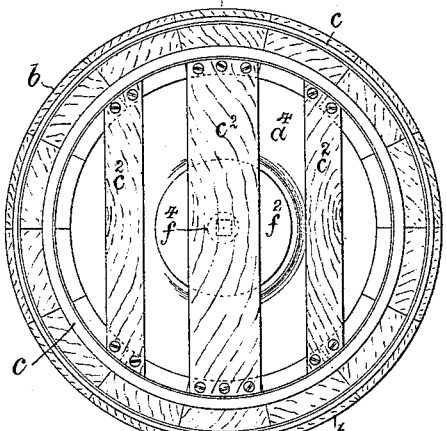
Figure 9:
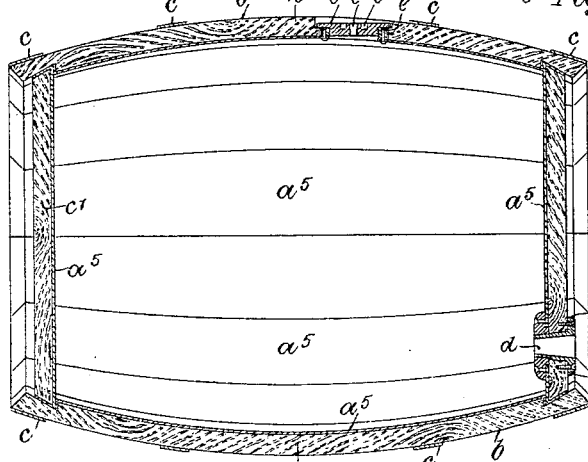
Figure 10:
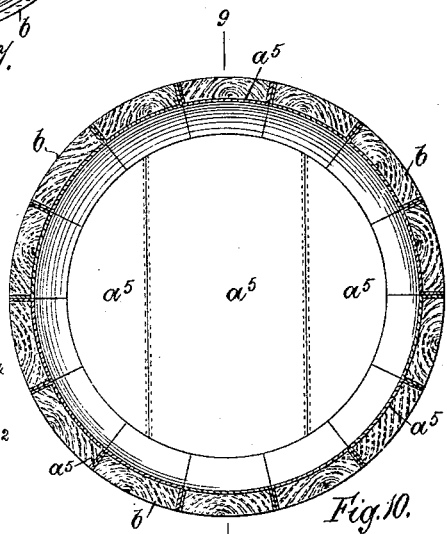
Figure 12:
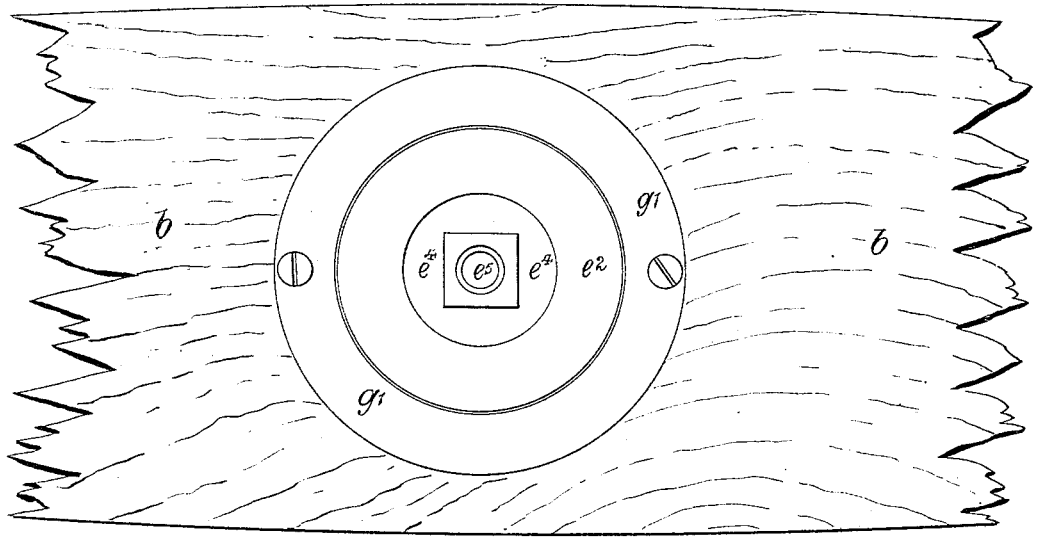
Figure 11:
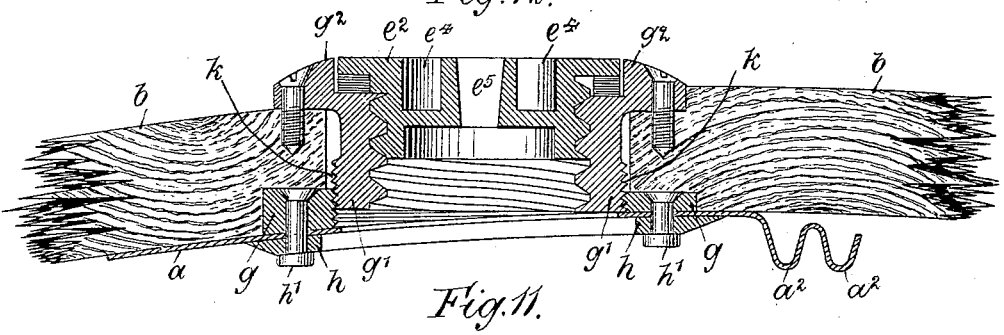
Figure 13:
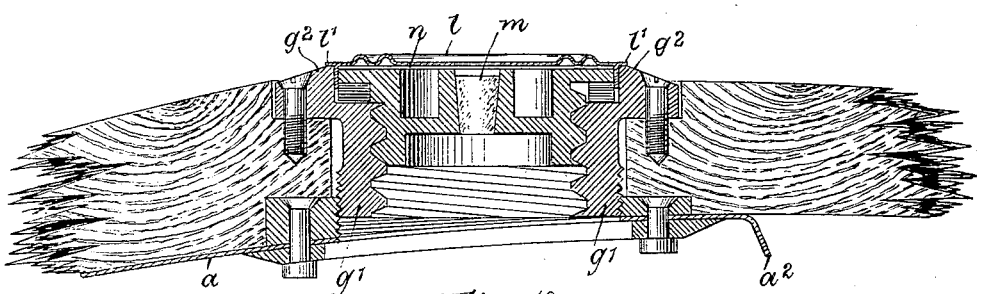
Figure 14:
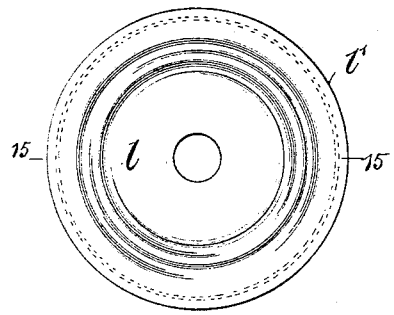
Figure 15:

Referring to the accompanying figures, which are to be taken as part of this specification and read therewith, Figure 1 is a longitudinal section of an aluminium cask inclosed in a wooden casing, both made according to the present invention. It is taken along the line 1 1 of Fig. 2. Fig. 2 is an elevation looking at Fig. 1 from the left. Fig. 3 is a sectional elevation taken along the line 3 3 of Fig. 1, looking at it from the right. Fig. 4 is a plan of Fig. 1. Fig. 5 is an elevation looking at Fig. 1 from the right. Fig. 6 is a longitudinal section of an aluminium cask inclosed in a modified form of wood casing, both made according to the present invention. It is taken along the line 6 6 of Fig. 7. Fig. 7 is an elevation looking at Fig. 6 from the left. Fig. 8 is an elevation looking at Fig. 6 from the right. Fig. 9 is a longitudinal section of an aluminium cask and its wood casing according to a modification of the said invention. It is taken along the line 9 9 of Fig. 10. Fig. 10 is a sectional elevation taken along the line 10 10 of Fig. 9, looking at it from the right. Fig. 11 is a sectional elevation of a modified construction of bung-hole. Fig. 12 is a plan of Fig. 11. Fig. 13 is a sectional elevation of bung-hole and metal protecting-cap. Fig. 14 is a plan of the protecting-cap. Fig. 15 is a sectional elevation taken on the line 15 15 of Fig. 14.

$a$ is the aluminium cask. It is made either by spinning, stamping, casting, or otherwise, as may be preferred or found convenient, according to the circumstances of the particular case. It may be made either in one or two pieces. If it is to be made in two pieces, I prefer that the suture or line of junction should be in a plane equidistant between the two ends of the cask—*i. e.*, in the position indicated by the dotted line $a'$ in Fig. 1. The junction is made by soldering, riveting and soldering, with or without intermediate packing, or by any other equivalent process.

Special provision is made to allow the cask to expand and contract under changes of temperature. This provision is shown in Figs. 1 and 6 as consisting of two corrugations $a^2 a^2$, one on each side of the plane $a'$ above mentioned. The invention does not limit me to either the number or the position of these corrugations. At the same time I prefer the central position illustrated and consider that the number stated, especially when taken in conjunction with the proportionate size illustrated, suffices.

The cask-head $a^3$ and bottom $a^4$ (or front and rear ends) are not in the same plane as the respective edge of the cask side, but stand nearer each other than that by a short distance. A section of the actual junction of either end with the side is V-shaped, such junction being concave to the inside of the cask.

The function of the casing of the aluminium cask is to strengthen it and to shield it against rough usage from the outside. The material may be any possessing the necessary qualities. The figures illustrate wood applied stavewise with head and bottom (or front and rear ends) of pieces doweled together. The staves $b\ b$ are of the well-known conformation. They fit close to the outside of the aluminium cask $a$ and are held in position there by hoops $c\ c$ in the same way as are those of ordinary wood casks. These hoops are of any suitable material. Special provision is made for insuring that the staves $b\,b$ shall have the correct contour in both directions, so that every portion of the inner face of each stave shall be equally in touch with the corresponding portion of the outer surface of the cask side. It consists of a block, preferably of iron, of the same size exactly as the aluminium cask $a$ and having a smooth surface. The staves are laid upon and around this block and fitted and pressed thereto until they fit to it and to each other exactly. The head $b'$ and the bottom $c'$ are likewise of wood, as heretofore. They stand either a short distance within the side of the wood casing, which side is constituted by the staves $b\,b$, or flush with the ends of such casing and are held to the latter by any suitable means. Both, however, fit closely up to the respective head $a^3$ and bottom $a^4$ of the cask $a$. The head $b'$ and bottom $c'$ of the casing may be replaced, if preferred, by parallel bars $b^2\,c^2$, standing otherwise in the same respective positions and one of them always centrally across the respective cask end.

$d$ is the tap-hole. It is formed by a flanged socket $d'$, of aluminium, having its flange $d^2$ held to the head $b'$ or to the middle bar $b^2$ from the front by aluminium screws $d^3$. The inner end of the socket is screw-threaded, passed through a hole just large enough to admit the socket $d'$, and screwed into an aluminium boss $d^4$, previously bored and screw-threaded, and then riveted with aluminium rivets and soldered with the same metal to the cask-head $a^3$ to receive it. A special recess $d^5$ is provided between the head $a^3$ on the one side and the head $b'$ or the bar $b^2$, as the case may be, on the other side to make room for the boss $d^4$, and, if preferred, that portion of it in the head $a^3$ may be continued around the latter, producing an annular recess in it, into which the opposite back faces of the head $b'$ or bars $b^2$ are extended, excepting, of course, into that portion of it occupied by the boss $d^4$.

Like the tap-hole $d$ the bung-hole occupies the usual position. It receives special attention from the present invention.

Referring to Figs. 1, 3, 4, 6, and 9, $e$ is an internally-screw-threaded ring-socket, of aluminium, riveted with aluminium rivets and soldered with the same metal down upon the side of the cask $a$ about the bung-hole. The bung is a flanged aluminium plug $e^2$, screw-threaded to engage in the ring-socket $e$. There is a sufficiently large hole $e^3$ in the respective stave $b$ to allow of the plug $e^2$ being screwed down into the ring-socket $e$ till it stands below the outer face of the said stave. To insure a perfect joint, a small rubber washer is placed between the faces of the plug $e^2$ and the ring-socket $e$. $e^4$ is an angular recess in the outer face of the plug. Its function is to receive a key or wrench by which the plug can be screwed out of the socket $e$ or screwed back into it. It may be here pointed out that the combination of the special contour of the recess $e^4$ and its key or wrench with an arrangement by which the said key or wrench shall never be in the hands of the retailer, but only in those of the maker of the liquid contents of the cask $a$, will prevent the bung-hole being opened for the adulteration of such contents.

$e^5$ is the usual spile-peg hole. It is used as heretofore.

In the modification of bung-hole fittings illustrated in Figs. 11, 12, and 13 instead of the internally-screw-threaded ring or bung-hole socket $e$ being riveted and soldered directly upon the side of the cask, as above described, the cask is provided on the outside, around the bung-hole, with an internally-screw-threaded ring or bung-hole casting $g'$, which is backed up on the inside of the cask by a stiffening-ring $h$, and the two said rings are fastened together, preferably by means of bolts or rivets $h'$, having one countersunk head flush with the face of the said bung-hole casting, as shown. A flanged bush $g^2$ has external screw-threads $k$, which when the parts are brought together engage with those on the internal wall of the said bung-hole casting $g'$. The bush in question is also provided with internal screw-threads $k'$, extending from the bottom up to a recess P near the top, which recess is surrounded by the flange $m'$. Through holes in the said flange screws $m''$ are inserted into the stave upon which it takes its bearing and serve to prevent the said bush from turning after being screwed home. A screw-threaded plug $n$ fits tightly into the screw-threaded bush $g^2$. This plug is also provided with a flange, and when screwed right home the said flange projects into the recess P, and its top is below the top of the flange $m'$ of the bush $g^2$. A packing-ring or washer $o$, of soft material, is preferably placed on the ledge of the recess P to make a liquid-tight joint between the bush $g^2$ and the screw-plug $n$ when the latter is screwed in.

In Figs. 14 and 15 are shown the plan and section, respectively, and in Fig. 13 the method of application of a metal cap (preferably corrugated tinned steel) for protecting the screw-plug from damage during the rolling of the cask and at the same time to keep the dirt out. By reference to Fig. 13 it will be seen that the aluminium bush or socket $g^2$, which is slightly arched, is let into the wood and as nearly flush with it as possible. The flange $l'$ of the cap $l$ rests upon the aluminium flange $m'$ of the bush $g^2$ and the cork $m$ is inserted in the screw-plug $n$. When the screw-plug is home, it stands below the level of the aluminium flange on $g^2$, so that when the cap $l$ is fixed in position there is a space $n'$ between it and the top surface of the screw-plug $n$, a provision to prevent the cap from pressing upon the screw-plug when the cask is rolled. A hole is provided in the center of the protecting-cap $l$ to enable a peg to be inserted to force the cork $m$ in when opening or "tapping" the cask. The said hole in the center of the cap would under ordinary circumstances be covered by a direction-bearing label.

My invention provides in the following way for my incased casks, that have been exported full of liquid and emptied at their destination, acquiring a special value instead of sinking to the level of mere empties. This value is acquired by reason of the incased cask being adapted to have packed in it solid goods for carriage to the country from which the same cask full of liquid was exported. Such adaptation consists in a manhole in the bottom $a^4$ and which is continued through the bottom $c'$. When the casing ends consist of parallel bars $b^2 c^2$, the central bar $c^2$ is too narrow to be cut. It must be detached from the casing side to give access to the manhole.

$f$ is an internally-screw-threaded ring-socket, of aluminium, riveted with aluminium rivets and soldered with the same metal to the cask-bottom $a^4$, about the hole therein.

$f^2$ is a flanged aluminium plug screw-threaded to engage in the ring-socket $f$. There is supplied any suitable device for holding the plug $f^2$ in the ring-socket $f$ against the contents of the cask being tampered with, while allowing of such plug being removed from its socket $f$ at either end of the cask's journey for the purpose of respectively packing the empty cask and unpacking it—e. g., keys or wrenches adapted to engage in the recess $f^4$, which so far resembles that described in connection with the bung $e^2$.

Either or both the rings $e f$, with the respective plugs $e^2 f^2$, may stand flush with the outside of the casing or below the same. In the latter case the plug may be covered with a sunk and flanged steel plate $g$, which fits into and over the hole in the casing and to which it is made fast, but removably so. Its surface may be advantageously used for advertising purposes.

The tightness of each of the riveted and soldered joints described above may be further assured by the presence of a washer of asbestos or equivalent material and which is inserted between the two metal surfaces in question prior to the riveting and soldering.

It must be pointed out that the bearing of the flange $d^2$ of the tap-socket upon the casing-head $b'$ prevents hammer or mallet blows upon either such flange or socket reaching the junction of the said socket with the cask-head $a^3$. Both the ring-sockets $f$ and $e$, above described, may be fitted with similar flanges adapted to bear upon the casing for a like purpose.

The stavewise construction of the casing side and the multiple-piece and dowel construction of the casing-head $a^3$ and bottom $a^4$ permit of the aluminium cask being combined with the different staves and pieces of the casing.

It is probable that casks made according to the present invention will leak a little at the bung-holes or at the manholes or that some of the liquid will be spilled in the act of filling them. In either of such cases the liquid will settle upon the staves or pieces around and near the said holes and be absorbed by the material of the said staves or pieces. The latter are therefore coated with hot paraffin wax or other suitable and equivalent substance for the purpose over as much of their surfaces as the risk of leakage or spilling above referred to may render advisable. The soldered joints at the same holes are coated in the same way.

Where the above-mentioned holes occur in the wood casing, I place india-rubber washers or other suitable material between the inside of the casing and the cask $a$ about the respective holes, so as to make a perfectly tight joint, with the object of preventing liquid escaping between the said casing and cask.

I claim—

In an aluminium barrel or cask corrugated circumferentially and incased, the combination with the body thereof, of the combination of bung-hole fittings consisting of the rings $g'$ and $h$ secured together and to the cask around the bung-hole, the flanged bush $g^2$ flush with the outside of the casing, its bottom end engaging in the screw-threads of the said ring $g'$ and its flange bearing on the ledge in the adjacent casing, the flanged plug $n$ adapted by means of a central polygonal boss and surrounding channel to be inserted and removed only by means of a special key and bored to receive a cork, the said cork $m$, the soft washer $o$ and the protective cap $l$ adapted by means of a horizontal flange to rest on the bush at a level above the bung or screw-plug, and by means of a vertical flange to be fixed between the plug or bung and its bush, all constructed and arranged as and for the purposes described.

In witness whereof I have hereunto affixed my signature, in presence of two witnesses, this 6th day of October, 1897.

WILLIAM ROWLAND TAYLOR.

Witnesses:
 HUTCHINSON WILD,
 JAMES TONKIN COLEGATE.